(12) United States Patent
Pulfer et al.

(10) Patent No.: US 8,171,540 B2
(45) Date of Patent: *May 1, 2012

(54) METHOD AND SYSTEM FOR E-MAIL MANAGEMENT OF E-MAIL HAVING EMBEDDED CLASSIFICATION METADATA

(75) Inventors: Charles E. Pulfer, Ottawa (CA); Connor Warrington, Ottawa (CA)

(73) Assignee: Titus, Inc. (CA)

( * ) Notice: Subject to any disclaimer, the term of this patent is extended or adjusted under 35 U.S.C. 154(b) by 944 days.

This patent is subject to a terminal disclaimer.

(21) Appl. No.: 12/135,088

(22) Filed: Jun. 6, 2008

(65) Prior Publication Data
US 2009/0030884 A1 Jan. 29, 2009

Related U.S. Application Data

(60) Provisional application No. 60/942,982, filed on Jun. 8, 2007.

(51) Int. Cl.
*G06F 9/00* (2006.01)
*G06F 15/16* (2006.01)
(52) U.S. Cl. ............... 726/14; 726/22; 726/25; 726/26; 726/27; 713/165; 713/166; 713/167; 713/168; 709/203; 709/205; 709/206
(58) Field of Classification Search .............. 726/14, 726/22, 26, 27; 713/152, 165, 166, 167; 455/410; 709/206
See application file for complete search history.

(56) References Cited

U.S. PATENT DOCUMENTS

| 5,958,005 A | 9/1999 | Thorne et al. ............... 708/702 |
| 5,991,709 A | 11/1999 | Schoen ........................... 704/1 |
| 6,591,367 B1 | 7/2003 | Kobata et al. ............... 713/201 |
| 6,829,613 B1* | 12/2004 | Liddy ........................... 707/694 |
| 6,836,846 B1 | 12/2004 | Kanevsky et al. ............ 713/193 |

(Continued)

FOREIGN PATENT DOCUMENTS

| AU | 2003202436 | 3/2003 |
| WO | WO02/059867 | 8/2002 |

OTHER PUBLICATIONS

Mark Wilson (Classify for Outlook; Key Features, http://www.markwilson.ca/outlook.html; http://www.markwilson.ca/read-me.html; http://www.markwilson.ca/oshot.html), May 23, 2005, 8 pages.

(Continued)

*Primary Examiner* — Nasser Goodarzi
*Assistant Examiner* — Shanto M Abedin
(74) *Attorney, Agent, or Firm* — Hayes Soloway P.C.

(57) ABSTRACT

A method and system method for e-mail management of e-mails having embedded classification metadata. A query from an end user to access an e-mail account by an e-mail client is received. It is then determined whether the query has come from an insecure e-mail client, such as a web e-mail client. Access rules for defining classification access restrictions for the e-mail client to access e-mail in the e-mail account are retrieved when the e-mail client is determined to be insecure. The e-mail query can then be modified before sending to an e-mail server storing the email account. The query is modified based on the retrieved access rules to exclude retrieval of e-mails based upon the e-mail classification metadata.

16 Claims, 6 Drawing Sheets

U.S. PATENT DOCUMENTS

| | | | |
|---|---|---|---|
| 6,986,049 B2 | 1/2006 | Delany | 713/176 |
| 7,020,654 B1 | 3/2006 | Najmi | 707/100 |
| 7,110,983 B2 | 9/2006 | Shear et al. | 705/55 |
| 8,024,304 B2 | 9/2011 | Pulfer et al. | 707/694 |
| 8,024,411 B2 | 9/2011 | Pulfer et al. | 709/206 |
| 2003/0065727 A1* | 4/2003 | Clarke et al. | 709/206 |
| 2003/0182583 A1 | 9/2003 | Turco | 713/201 |
| 2003/0236845 A1 | 12/2003 | Pitsos | 709/206 |
| 2004/0064733 A1* | 4/2004 | Gong | 713/201 |
| 2004/0111480 A1* | 6/2004 | Yue | 709/206 |
| 2005/0044066 A1 | 2/2005 | Hooper et al. | 707/3 |
| 2005/0060643 A1 | 3/2005 | Glass et al. | 715/501.1 |
| 2005/0138079 A1 | 6/2005 | Liu et al. | 707/104.1 |
| 2005/0144245 A1 | 6/2005 | Lowe | 709/206 |
| 2005/0153686 A1* | 7/2005 | Kall et al. | 455/412.1 |
| 2006/0041605 A1 | 2/2006 | King et al. | 707/205 |
| 2006/0053490 A1 | 3/2006 | Herz et al. | 726/23 |
| 2006/0075228 A1 | 4/2006 | Black et al. | 713/167 |
| 2006/0085469 A1 | 4/2006 | Pfeiffer et al. | 707/102 |
| 2006/0123091 A1* | 6/2006 | Ho | 709/206 |
| 2006/0168039 A1* | 7/2006 | Worthington | 709/206 |
| 2006/0288207 A1* | 12/2006 | Brown et al. | 713/166 |
| 2007/0050444 A1* | 3/2007 | Costea et al. | 709/202 |
| 2008/0091785 A1* | 4/2008 | Pulfer et al. | 709/206 |
| 2008/0104118 A1* | 5/2008 | Pulfer et al. | 707/104.1 |
| 2008/0184270 A1* | 7/2008 | Cole et al. | 719/318 |
| 2008/0270543 A1* | 10/2008 | Bhamidipaty et al. | 709/206 |
| 2008/0288597 A1* | 11/2008 | Christensen et al. | 709/206 |
| 2008/0289037 A1* | 11/2008 | Marman et al. | 726/22 |

OTHER PUBLICATIONS

Morrison, Geoff, "Implementation Guide for Email Protective Markings for Australian Government Agencies", Oct. 1, 2005 pp. ii-45, Department of Finance and Administration for Australian Government Information Management Office.

"Australian Government Email Metadata Standard (AGEMS), Version 1.0", National Archives of Australia, Dec. 2005. pp. 4-18.

Wyatt, Anthony, "Protective Markings in Email, Email Client Behaviour Specification", Australian Government, Department of Finance and Administration, Nov. 21, 2005, pp. 1-18.

Jones, et al., "Email Protective Marking Standard for the Australian Government", Australian Government, Department of Finance and Administration, Oct. 2005, pp. 1-34.

"Classify for Outlook; Key Features", (http://www.markwilson.ea/outlook.html; http://www.markwilson.ca/read-me.html; and http://www.markwilson.ca/oshot.html) May 23, 2005, 8 pgs.

"What is a COM Add-in?" and "Hooking a COM Add-in Up to a Command Bar Control" (http://msdn.microsoft.com/en-us/library/aa190119(office.10,printer).aspx and http://msdn.microsoft.com/cn-us/library/aa165301(office.10,printer).aspx, Microsoft Corporation/Visual Basic Programmer's Guide, published prior or during 2000, 3 pgs.

"Adobe Streamlines Workflows for Publishers with New Metadata Technology", Adobe Press Room, Sep. 24, 2001, 3 pgs.

"Titus Labs Document Classification V1.1" published Nov. 3, 2005, http://webarchive.org/web/20060104112621/www.titus-labs.com/includes/Pdf/DocClassDatasheet.pdf.

"Titus Labs Announces Document Classification for Microsoft Word", published Nov. 3, 2005, http://web.archive.org/web/20051126093136/http://www.titus-labs.com/about/Doc-ClassRelease.html.

Australian Official Action, dated Mar. 9, 2011 (3 pages).

* cited by examiner

METHOD AND SYSTEM FOR E-MAIL MANAGEMENT OF E-MAIL HAVING EMBEDDED CLASSIFICATION METADATA

CROSS-REFERENCE TO RELATED APPLICATIONS

This application claims priority from U.S. provisional application No. 60/942,982 filed Jun. 8, 2007 which is hereby incorporated by reference.

TECHNICAL FIELD

The present invention relates to computer systems and software, and in particular to electronic mail management and security.

BACKGROUND

Software applications exist to generate many different types of electronic mail. Web based e-mail software (web e-mail) allows users to access and send e-mail via standard Internet browser sessions. With today's pervasive networking systems such as local area networks (LANs), wide area networks (WANs) and the Internet, and software tools such as e-mail, it is very easy for individuals to send and read e-mail from different computers, computer systems and other individuals. As a matter of corporate security there is therefore a need to limit what e-mail users can read and access while viewing e-mail over unsecure channels such as the Internet, and while reading e-mail using unsecured non-corporate PCs (personal computers) using browser-based web e-mail such as Microsoft Outlook Web Access.

Typical web based e-mail systems allow the user to view any e-mail messages and attachments regardless of the sensitivity of the information contained in the e-mail. By definition, web based e-mail was designed to make it easy for users to view their e-mail wherever they are and whenever they want. Making e-mail access so easy also increases the likelihood of security breaches by orders of magnitude. Individuals passing by a user at a public kiosk can easily catch glimpses of secure documents or even see a user's entire logon name and password. Users can accidentally leave their account open when they leave a kiosk, so the next user will have complete access to all of their e-mails. And unless the web e-mail service is provided over a virtual private network (VPN)—and generally they are not—then the various Internet Service Providers, network Administrators and kiosk providers involved with the local system, may all have access to the e-mails. In addition, users with access to web based e-mail from their home computer may save sensitive e-mails or document attachments to their home PC, where the data will be beyond the control of the company they work for.

In addition, most web based e-mail systems keep a cache of e-mail read on the local computer. If the local computer is a public terminal, it is possible that anyone could view this e-mail information via examination of the cache. As a result, there is no current way to limit what e-mail can be viewed via web e-mail, and there is no way to protect e-mail information that is stored in the local cache of a publicly accessible computer.

In some jurisdictions, effective e-mail security is not just a matter of good business—it's the law. Compliance legislation such as the Sarbanes-Oxley Act in the United States (or more precisely, the Public Company Accounting Reform and Investor Protection Act of 2002), for example, requires that safeguards be put in place to ensure the accuracy of financial reports. These include security of electronic data against unauthorized access or change, both during transmission and in storage. In other jurisdictions, there can be great liability if personal client information is leaked or becomes public. Web e-mail provides more opportunities for these leaks to occur.

There is therefore a need for a method of and system for preventing users from viewing sensitive e-mail when viewed via web based e-mail systems.

SUMMARY

An improved method of and system for preventing the viewing of sensitive e-mail when using web based e-mail systems is provided, which obviates or mitigates at least one of the disadvantages described above.

Though users have full access to all of their e-mail when accessing their e-mail from a corporate computer on the corporate network, in order to ensure greater information security, companies may wish to limit what e-mail users can read when using web e-mail. Whereas companies may allow their users to view personal, unclassified or low security e-mail using web e-mail, they may wish to prevent users from viewing sensitive (e.g. classified, private, or confidential) e-mail when using web based e-mail.

In accordance with an aspect of the present disclosure there is provided a method for e-mail management of e-mails having embedded classification metadata, the method comprising the steps of: receiving a query from an end user to access an e-mail account by an e-mail client; determining whether the query has come from an insecure e-mail client; retrieving access rules for defining classification access restrictions for the e-mail client to access e-mail in the e-mail account, when the e-mail client is determined to be insecure; and modifying the received query, before sending to an e-mail server storing the email account, the query being modified based on the retrieved access rules to exclude retrieval of e-mails based upon the e-mail classification metadata.

In accordance with another aspect of the present disclosure there is provided a system for e-mail management of e-mails having embedded classification metadata, the system comprising: a memory; and a processor for executing the steps of: receiving a query from an end user to access an e-mail account by an e-mail client; determining whether the query has come from an insecure e-mail client; retrieving access rules for defining classification access restrictions for the e-mail client to access e-mail in the e-mail account, when the e-mail client is determined to be insecure; and modifying the received query, before sending to an e-mail server storing the email account, the query being modified based on the retrieved access rules to exclude retrieval of e-mails based upon the e-mail classification metadata.

In accordance with yet another aspect of the present disclosure there is provided a computer readable medium containing instructions for providing e-mail management of e-mails having embedded classification metadata, the instructions which when executed by a processor perform the steps of: receiving a query from an end user to access an e-mail account by an e-mail client; determining whether the query has come from an insecure e-mail client; retrieving access rules for defining classification access restrictions for the e-mail client to access e-mail in the e-mail account, when the e-mail client is determined to be insecure; and modifying the received query, before sending to an e-mail server storing the email account, the query being modified based on the retrieved access rules to exclude retrieval of e-mails based upon the e-mail classification metadata.

Other aspects and features will become apparent to those ordinarily skilled in the art upon review of the following description of specific embodiment of the invention in conjunction with the accompanying figures.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Figure 1:
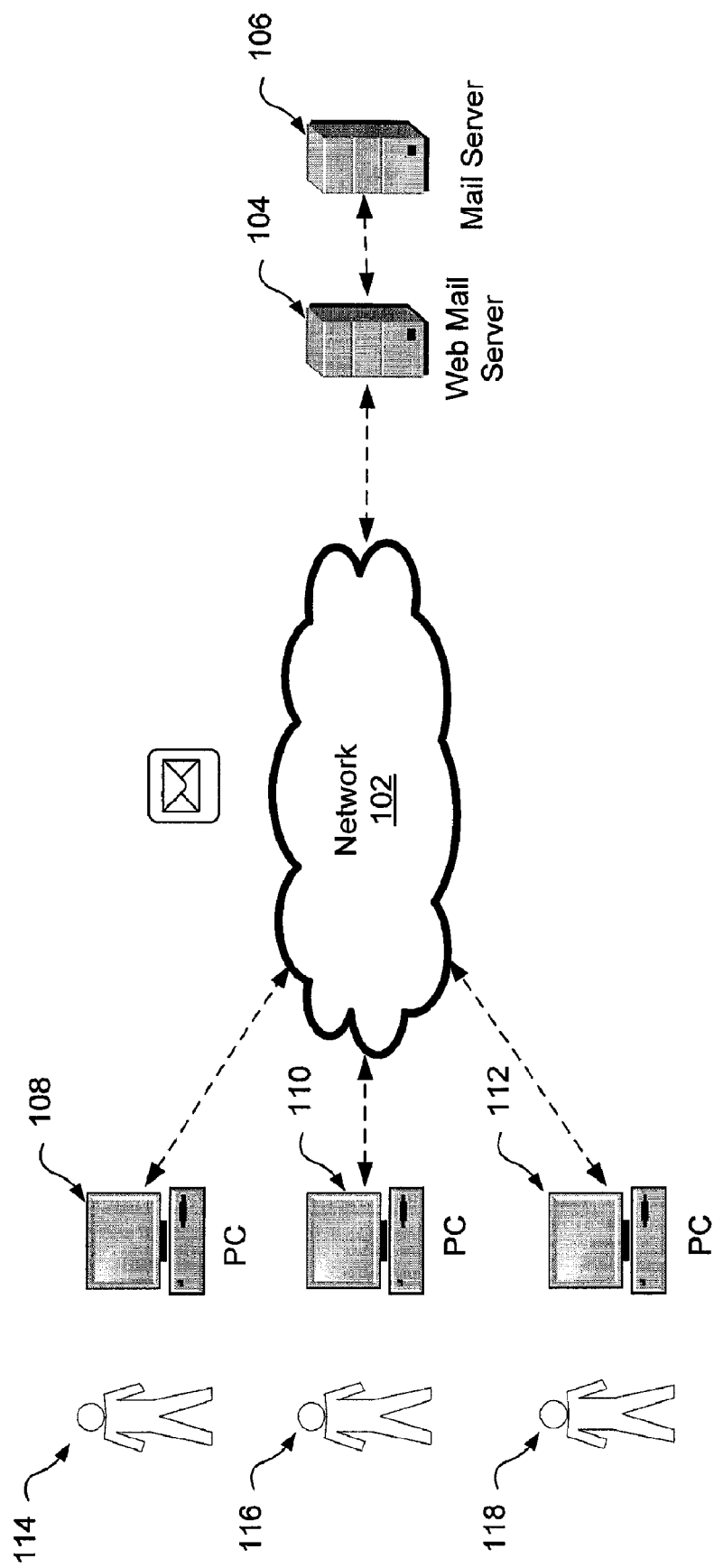
FIG. 1 presents a block diagram of web mail access.
Figure 2:
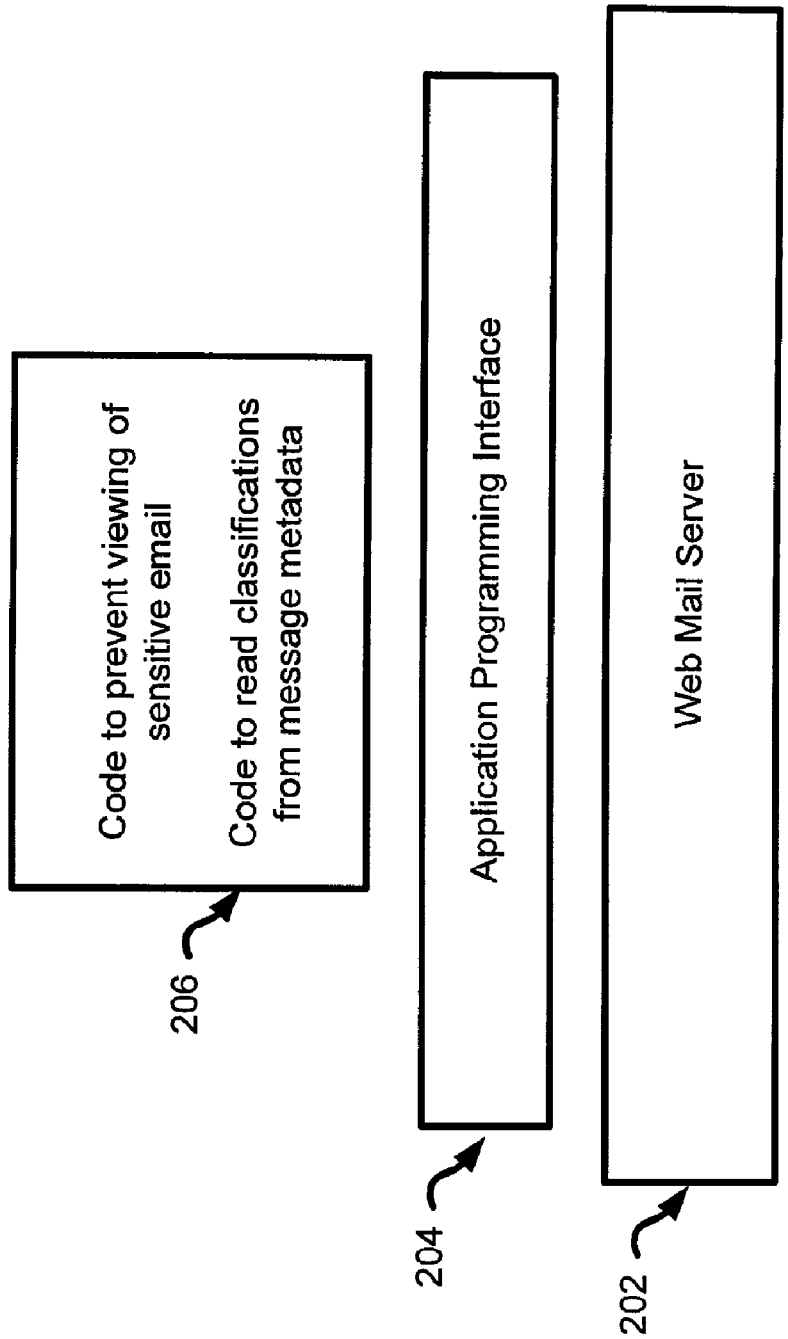
FIG. 2 presents a diagram of the software architecture for preventing the viewing of sensitive e-mail when using web e-mail.

Embodiments are described below, by way of example only, with reference to FIGS. 1-6.

Due to compliance legislation such as the Sarbanes-Oxley Act in the United States (or more precisely, the Public Company Accounting Reform and Investor Protection Act of 2002) and general requirements for greater security of information, companies need to be able to protect the distribution and viewing of certain information contained in e-mails. One of the ways to protect sensitive or confidential information is to limit what e-mail can be used over unsecured channels such as web based e-mail systems. Heretofore, this could not be done with web mail access software, such as Microsoft™ Outlook™ Web Access (OWA) software. Web mail programs such as OWA cannot prevent the viewing of sensitive e-mail. However, the system and method described herein can prevent the user from viewing and reading messages classified as containing certain sensitive information.

In addition to allowing the viewing of only certain classifications, the system and method allows administrators to block viewing of any messages that have not be classified when they were sent. This ensures that e-mail which carries no classification, but may be sensitive, is not viewable over web based e-mail systems. As described above, the web mail server receives e-mail queries from End Users and determines whether a given query can be satisfied. Since the web mail server is considering the e-mail classification metadata to determine which e-mails can be forwarded to the end user, any e-mails that are not classified at all can be blocked from access.

The present disclosure provides easy-to-use administration tools which allow administrators to determine what type of information will be viewable by users over web based e-mail systems such as Microsoft OWA. Administrators can modify the configuration file on the OWA Server to determine what type of e-mail users can view. This file (settings.js) contains the configurations for the software. By editing the settings file on the Outlook Web Access Server, administrators can immediately change what e-mails are viewable. For example, users can be restricted from opening e-mails that have an attachment by configuring one of the file settings to OFF (0). The system does not have to analyze or parse attachments to determine whether they can be forwarded—it merely has to check the e-mail metadata to make this determination. The default in the event that a type of attachment cannot be identified, is simply to block the attachment. Of course, access to the administration controls are protected using standard password access and similar control/access/security systems.

By limiting access to classified e-mail when a public web mail client is being used, personal private information is protected to ensure compliance with legislation such as Sarbanes-Oxley, the Health Insurance Portability and Accountability Act (HIPAA), or other legal or corporate guidelines.

A system and method for preventing the viewing of sensitive web based e-mail works in concert with, and is complementary to, all e-mail pre-classification systems is provided. In each case, the following exemplary e-mail classification systems tie some form of metadata to specific e-mails to define a classification property:

a) The Titus Labs™ Message Classification for Web Access (OWA) product allows the users to classify web based e-mail based on e-mail-specific properties such as security classification, document type, document retention, document caveats, and the like. The system generates e-mail properties that are associated with the e-mail as well as inserting visual markings in the e-mail that allow users to quickly identify the security, sensitivity, intended distribution or retention requirements of the document;

b) The Australian E-mail Protective Marking standard provides a method for classifying e-mail and creating e-mail metadata via the X-protective marking in the e-mail header; and c) E-mail programs such as Microsoft™ Outlook™ 2007 allows users to add a classification property to e-mail. This metadata is placed in the e-mail x-header, however the classification is only provided for identification purposes and is not utilized to limit access.

As an example, using e-mail pre-classification a user could classify an e-mail as SECRET. This would automatically create an e-mail property which identifies the e-mail as secret. The property travels with the e-mail to ensure that the recipient is aware of the classification.

Existing classification properties only provide information as to what the author deemed the content to be classified as. The ability to limit viewing of the actual e-mail has not been provided. Existing web mail clients do not allow administrators to prevent viewing by end users of sensitive e-mail that have been classified. As an example, when users create new e-mail, classifying their messages for example as either UNCLASSIFIED or CONFIDENTIAL, the present system and method prevents any recipients from viewing the CONFIDENTIAL e-mail when reading messages via web based e-mail systems, whereas when a more secure client, such as a desktop client, is utilized access to the content is enabled.

FIG. 1 provides a high level overview environment for preventing the viewing of sensitive e-mail when using web e-mail. A user accesses a web mail client through a web browser, such as but not limited to Internet Explorer™, Firefox™, or Safari™ as executed by computers 108, 110 and 112 having processors and memory which are operated by users 114, 116 and 118 respectively. The client may be a personal computer, notebook computer or portable computing device such a mobile phone or personal digital assistant (PDA) device. In a networked environment the clients 108, 110, 112 can access a web mail server 104 through a network 102 such as the internet. The web e-mail server 104 can provide access a mail server 106 each having memory and processors to implement e-mail management based upon embedded classification metadata. Alternatively, e-mail server 106 may host the web e-mail server 104 on the same system and be incorporated in a single application or integrated through additional software modules. When it is determined that the user is accessing by a web client, or by insecure access means, any e-mail queries are modified to limit access to classified e-mails based upon administrator restrictions.

Administration options are provided which allow an administrator to decide what type of e-mail a user will be able to view when reading messages via web e-mail client such as Microsoft Outlook Web Access. For example, if all e-mail is classified in one of three categories—PERSONAL, CONFIDENTIAL and SECRET, the administrator has the option for defining access rules for allowing:
  a) no viewing of e-mail over web e-mail;
  b) viewing only of PERSONAL e-mail;
  c) viewing only personal and CONFIDENTIAL e-mail, or
  d) view all e-mail.

Administrators can restrict viewing of e-mails with attachments over web based e-mail. For example, if an e-mail has a document attached to it, the administrator could restrict viewing of the e-mail. In addition restriction of e-mail with attachments regardless of the type of attachment is provided.

The following example provides more details on the system operation. In this example, Microsoft Outlook Web Access is used as the web based e-mail system, though other e-mail systems could also be used. The general architecture of the system is presented in FIG. 2. In short, the bulk of the system resides on web mail server 202, such as Outlook Web Access Server. The web mail server 202 supports an application programming interface 204 such as a JavaScript Environment. The web server functionality may be part of the mail server itself. The software code on the web mail server 206 is operable to:
  receive queries from users, to access web e-mail;
  receive instructions or rules from an administrator, regarding how web e-mail access should be restricted. These rules can be established on a user group basis, company wide basis, or other paradigm;
  determine whether to fulfill the queries from the users, by considering the restrictions established by the administrator;
  fulfilling queries that are authorized by forwarding any such queries to the Microsoft Exchange e-mail database; and
  forwarding returned e-mail, to the user.

Figure 3:
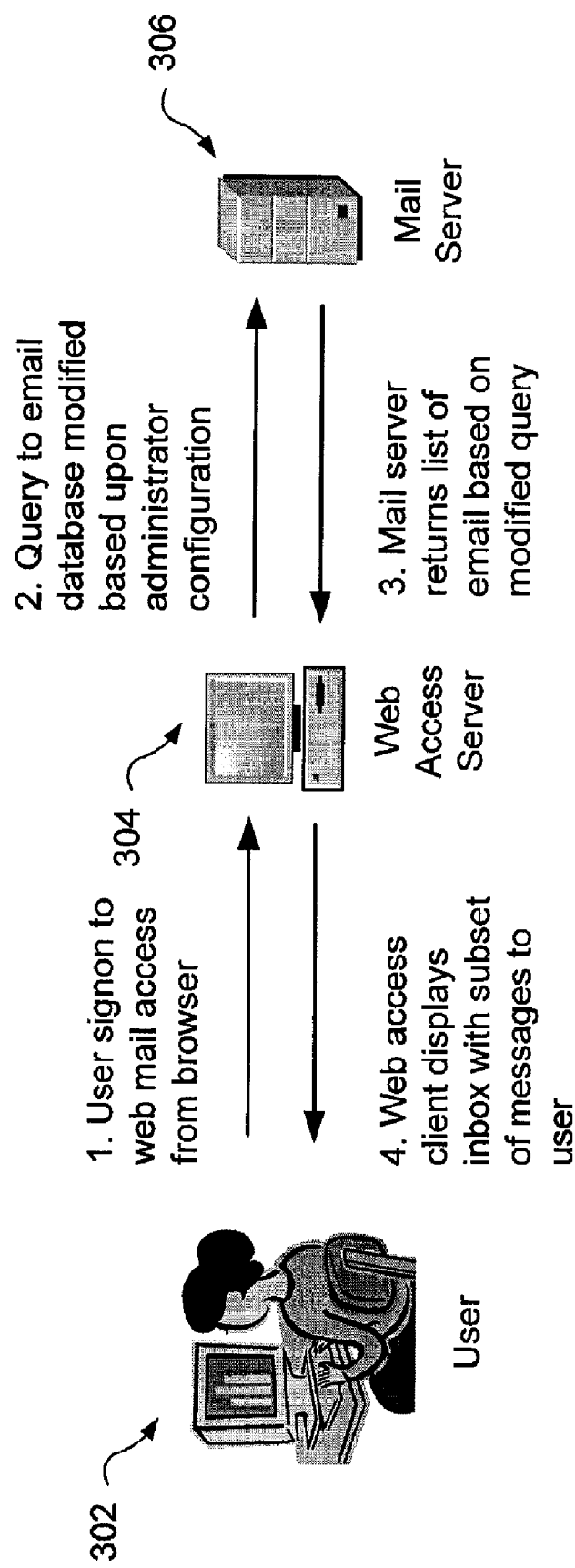
FIG. 3 presents a process flow diagram showing the data flow through the primary physical entities of the system.

The flow of the system is also illustrated in FIG. 3. The following steps describe how a user would get access to their web based:
1) user 302 signs on to a web client, such as provide Microsoft Outlook Web Access, in order to view their e-mail over the web. User supply their userid and password to signon in the normal fashion.
2) normally, the user's Microsoft Outlook Web Access server 304 does a query of all the e-mail on the e-mail server (Microsoft Exchange) to find and display all the e-mail for the particular user signing on. However, the query is modified to include classification restrictions. Instead of issuing a query asking for all e-mail for a particular user, the user's Microsoft Outlook Web Access server queries for a subset of the user's e-mail. For example, the client-side query may request only the UNCLASSIFIED e-mail for a particular user if the administrator has configured limited e-mail access (UNCLASSIFIED only). Or, the query may request only e-mail that has no attachments if the administrator has configured "no attachment access" for the user. A query is submitted for limited subsets of e-mail based on message properties that already exist (for example—classification metadata, or attachment properties that exist within the e-mail header or metadata).
3) the stored metadata are considered with respect to the security rules configured by the administrator, so it can be determined what portion (if any) of the e-mail can be accessed. For example, if the administrator has configured to only allow access to UNCLASSIFIED e-mail, and if the user is using the Titus Labs Web Access Classification System, the e-mail results can be limited based on a query of the x-titus-classification property of the e-mail (e.g. where x-titus-classification is equal to UNCLASSIFIED)
3) once the modified query is submitted and the results are returned from the e-mail server 306
4) the e-mail subset is displayed to the users via the standard Microsoft Outlook Web Access interface.

Figure 4:
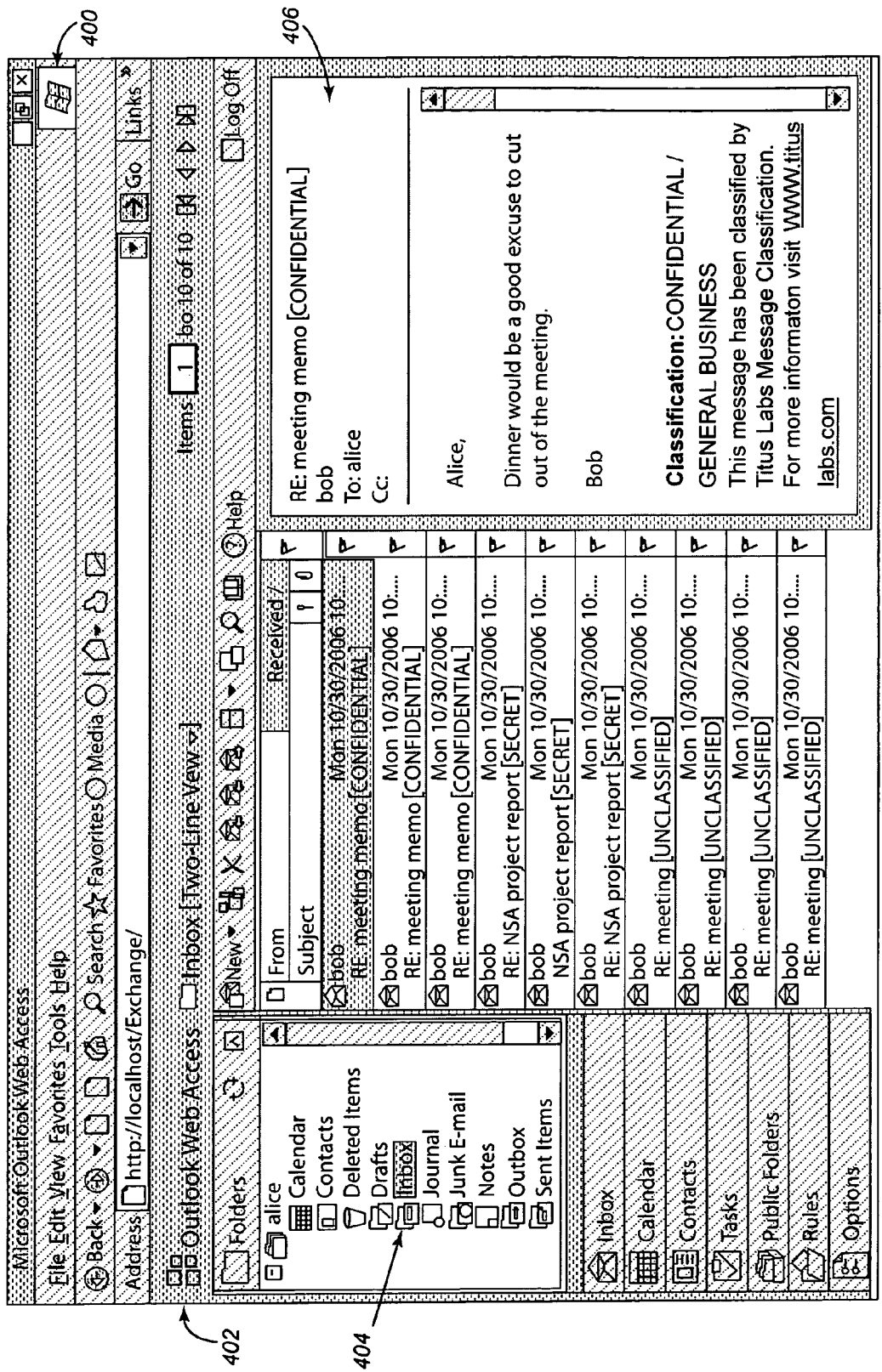
FIG. 4 presents a screen capture of an Outlook Web Access Inbox with three different categories of e-mail metadata.
Figure 5:
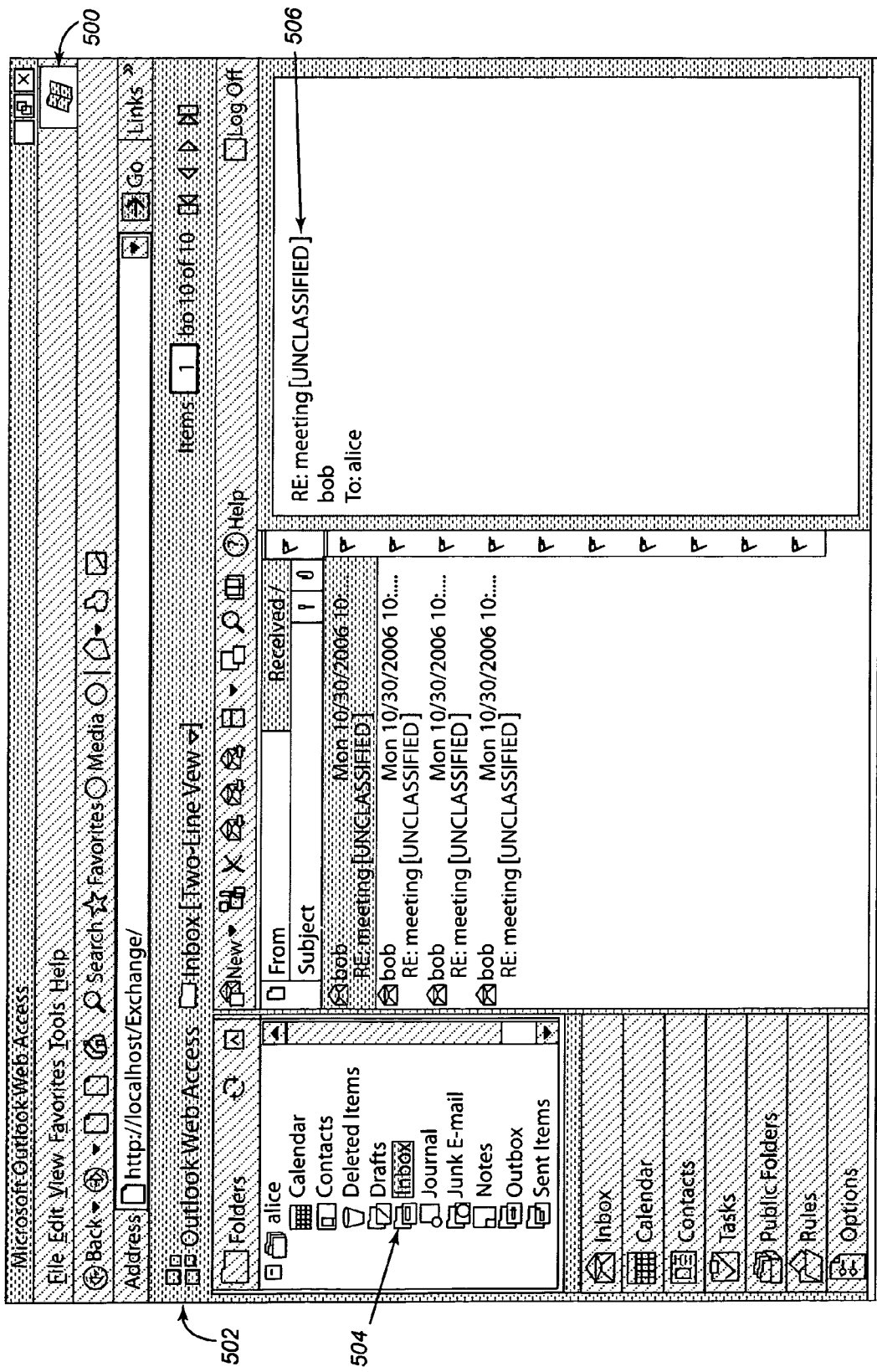
FIG. 5 presents a screen capture of the same Outlook Web Access Inbox where viewing of messages to UNCLASSIFIED e-mail only is prevented.

FIGS. 4 and 5 present screen captures of exemplary user interfaces in an embodiment. Specifically, FIG. 4 presents an exemplary Outlook Web Access client 402, in a web browser 400, providing an Inbox 404 through a user interface with all classification of messages showing, including UNCLASSIFIED, SECRET and CONFIDENTIAL. The classification associated with the message is defined in the subject line 408. Although classifications are present no filtering or limiting of access is provided. All classification message levels can be seen in an unrestricted access environment.

In contrast, FIG. 5 presents an exemplary Outlook Web Access client 502, in a web browser 500, providing Inbox 504 through a user interface with only UNCLASSIFIED messages presented as shown in the subject line 506. In both cases, the user interface appears very much as it would for any e-mail application, including the usual toolbars, folder window, list of e-mail messages and the like. The only significant distinction is that the level of security is displayed in the subject (re) line of each e-mail, with a more detailed definition in each e-mail itself. And of course, e-mails that the user is not authorized to view, do not appear at all. Alternatively, classified message headers may be viewable, however when the user selects the message the message content will not appear and an alternative message is provided.

There is no published application programming interface (API) for Microsoft Outlook Web Access. In order to prevent messages from being viewed in Outlook Web Access the actual Microsoft OWA Javascript code needs to be changed and enhanced. As a result a very good understanding of the original Microsoft OWA code is required.

Because the OWA Javascript code is modified, any time that Microsoft issues a new version or service pack of OWA the system needs to be modified, resulting in slightly different code for each version of Microsoft OWA. In order to be able to ship only one version of the system we needed to come up with an install process that can recognize the current running version/service pack/fix of Microsoft OWA and install the correct code. This was done by calculating a hash of the Microsoft code and comparing the hash against stored codes representing each running version/service pack/fix of Microsoft OWA prior to installation.

Some e-mail systems such as OWA will allow users to submit direct requests for specific e-mails if they know the e-mail Subject name (rather than accessing via clicking on the message in the Inbox). For instance, if there is an e-mail with a Subject of "Company Meeting", a user may be able to request the viewing of this e-mail simply by typing in a web address such as http://owa.example.com/exchange/username/Company%Meeting.eml. This means of accessing e-mails as it could be used to get around the restrictions to web e-mail viewing. In order to continue to restrict viewing sensitive e-mail based on the administrator configuration, these requests are intercepted and it is determined whether they are outside what the administrator has allowed. If this is the case, system will immediately close the viewing window for this e-mail as soon as it starts to display so the user will not have time to read the e-mail. Alternatively, one could simply block all requests of this type.

The following describes the logic of the software and the associated triggered actions. The system adds functionality to the OWA client (Microsoft OWA is referred to here as "existing" files or functions). It does this by modifying the files on the Microsoft Exchange server that sit in the Exchange directory (default location of C:\Program Files\Exchsrvr\exchweb). Following is a list of files the may be modified or added to that directory. For each file will be a list of functions with a short description.

--- frm__ReadNote.js
    Summary: Existing Javascript file that is used when a message is being read
function window.onload( )
    Summary: Existing function that is called when the window is loaded Prevent opening of a message with improper classification
settings.js
    Summary: New Javascript file that contains a list of variables used to control the behavior of the product
ctrl__View.js
    Summary: Existing Javascript file that is used when the inbox is being displayed
function mf__setAttributes ( )
    Summary: Called when the contents of the inbox is being retrieved

---

Modifies the query sent to the mail server such as Microsoft Exchange Server to only return messages that have the proper classification.

When a web client is showing the Inbox, it sends a query to the Exchange Server that specifies what messages to retrieve. In this query are certain restrictions like what folder you are looking in (Inbox, Drafts, Sent Items, etc.). The web e-mail server is modified by adding extra restrictions into the query before the query is sent to the mail server or Exchange Server. Instead of the query only specifying what folder to return items from, restrictions are added stating what classification a message has to be. Restrictions are also added to only show messages without attachments when g_SettingsRejectAttachments is enabled.

When a user wishes to view a message instead of that request going to the original mail web client code, the classification code is accessed. If the request meets the criteria for viewing the message then the request is passed on to the original web client code for viewing. If the request does not meet the criteria for viewing a message then an error message is displayed as specified in g_SettingsRejectMessage to the user instead of passing on the request to the original mail web client code.

Based upon the web mail access client the mail classified mail may provide different options on how to limit user access. For example a web client such as OWA 2003, the user does not even see the prevented e-mails in their Inbox. In another client such as Outlook Web Access 2007, the user sees the e-mail in their Inbox, but when they go to open it they see a message like "Viewing of sensitive messages are not allowed using Outlook Web Access".

In a web client such as, OWA 2003 the basic structure is the client sends a SEARCH HTTP (HyperText Transfer Protocol) command to the Exchange Server with XML sent with the request. This XML (eXtensible Markup Language) wraps an SQL (Structured Query Language) query. The actual SQL query is modified to access the desired e-mail. The basic format of the SQL sent to the Exchange Server is:
    SELECT some basic information from the messages
    FROM database
    WHERE the messages match certain criteria
    ORDER BY date received The WHERE clause is modified to prevent e-mail viewing an implement administrator preferences. Depending on the administrator configuration, such as defined by a settings.js, criteria can be added like "classification of message=UNCLASSIFIED" or "message does not have attachments".

Some settings in the settings.js file that are used to configure the prevent viewing are:

g_SettingsRejectAbove is a number that determines which messages will be viewable via OWA. If the defined first level tags are "UNCLASSIFIED;CLASSIFIED;SECRET", and administrator sets g_SettingsRejectAbove to 0 than all messages are viewable. If the administrator sets it to 1 and only UNCLASSIFIED messages are viewable. Set it to 2 and only UNCLASSIFIED and CLASSIFIED messages are viewable.

g_SettingsRejectAttachments is a Boolean (true or false), and when set to true will block access to all messages that have an attachment on them. When set to false all messages with attachments are viewable.

g_SettingsRejectMessage is a string that is displayed to the user when the user attempts to open a message that has a classification above the setting for g_SettingsRejectAbove.

g_SettingsRejectUnmarked is a Boolean (true or false), and when set to true will prevent viewing of messages that have no classification.

The system and method can easily be modified to accommodate:

a) Preventing Web e-mail viewing for other web based e-mail systems besides Microsoft OWA, such as Lotus Notes™ Web Mail, G-mail™, Hotmail™, Yahoo Mail™, etc.;

b) Preventing viewing based on criteria other than message classification. For instance, the software may scan the contents of the e-mail to determine its, sensitivity and then block access on pre-determined levels of sensitivity;

c) Allowing the viewing of the message subject line only, but not the message body itself; and d) Blocking the viewing of attachments contained in messages such as documents or spreadsheets. For example, users can be allowed to view the message body, but denied the user to view any e-mail attachments.

Figure 6:
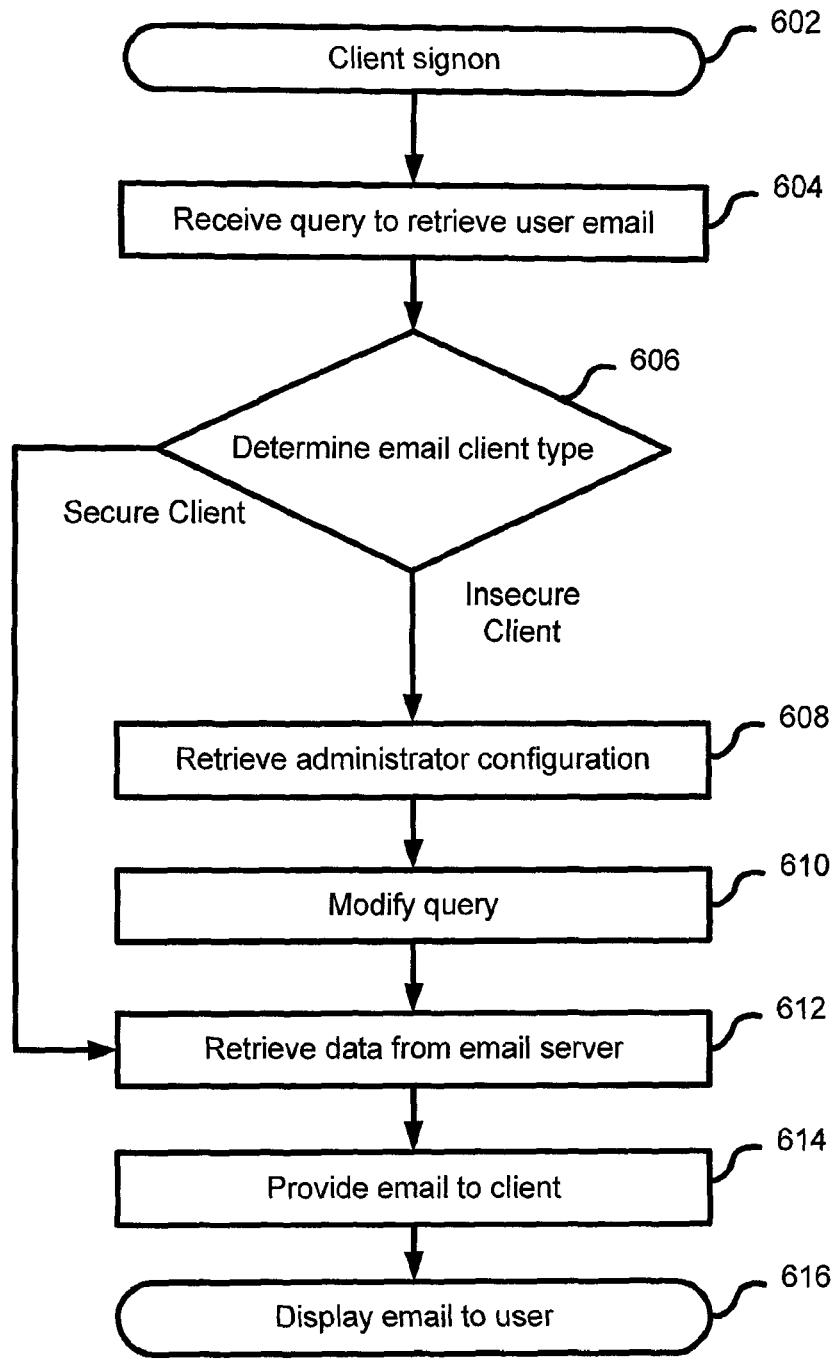
FIG. 6 shows a method e-mail management of e-mails having embedded classification metadata.

FIG. 6 presents a method for preventing viewing of sensitive e-mail when using a web mail application. The user signs on to a e-mail client at step 602. The signon is typically based upon a userid and password associated with the particular e-mail account. The system receives a query to retrieve e-mail for presentation to the user at 604. The system resides on the web e-mail server but mail be present within the actual e-mail server. It then must be determined if a secure client, such as a desktop client or a web client with a particular level of security or inscription is provided, or a insecure web client such as at a public computer at step 606. If the client is identified as secure, the query is unmodified and sent to the e-mail server for retrieval at 612. The e-mail is then provided to client at step 614 and displayed to the user at step 616. If the client is deemed insecure, the administrator configured access rules associated with the user, or server, is retrieved at step 608. The configuration defines what level of classification is to be restricted to the end user based upon the associated e-mail metadata, for example only UNCLASSIFIED e-mail should be viewed with the particular e-mail client and user account. The originating e-mail request query is then modified at step 610 to include classification restriction based upon the associated e-mail metadata and is sent to the e-mail server at step 612. E-mails are then retrieved at step 612 and comprise only the e-mails with appropriate level of classification based upon the metadata associated with each e-mail message on the e-mail server for the account. It is then provided to the client at step 614 and displayed to the user at step 616. Alternatively at step 608, classifications may be based upon attachments to specific e-mails, as a message may not be classified, the attachment may be classified. Also, it may also be advantageous to limit the ability to download attachments on specific web e-mail clients to eliminate the possibility the temporary files would be left behind.

In the determination of the client, it is assumed that different clients will use the same access or addressing methods to retrieve mail. While some clients and servers preferentially use vendor-specific, proprietary protocols, most support the Internet standard protocols Simple Mail Transfer Protocol (SMTP) for sending e-mail and Post Office Protocol version 3 (POP3) and Internet Message Access Protocol (IMAP4) for retrieving e-mail, allowing interoperability with other servers and clients. For example, Microsoft's Outlook client typically uses a proprietary protocol to communicate with an Exchange server as does IBM's Notes™ client when communicating with a Domino™ server, but all of these products also support SMTP, POP3, and IMAP4. Support for the Internet standard protocols allows many other e-mail Clients such as Pegasus Mail™ or Mozilla Thunderbird™ to access these servers and similarly allows the clients to be used with other servers. It may be assumed that all HTML web access is insecure and therefore client determination is not required. All e-mail would then be filtered based upon the administrator configuration.

Secure clients may be desktop clients or a web clients providing a pre-defined level of security encryption based upon user access such as Secure Sockets Layer (SSL) key lengths. Alternatively, it may be assumed that is the query is directed to a web mail server no client determination is required, and the communication is immediate considered unsecured and filtering is required. The determination of the security of the client may also be based upon location information associated with where the client is accessing the e-mail from. For example, if a web e-mail client access an account from within a secure domain, defined by an IP address or logon credentials the e-mail may not be restricted. Likewise if a desktop client originates an access request from outside a trusted network it may be restricted to only viewing non-classified e-mail if the appropriate security restrictions are not in place. The method of access may also be used to determine if a client is secure or insecure. For example all access via mobile or wireless networks, regardless of the end e-mail client may be determined to be insecure thus limiting access.

It will be apparent to persons skilled in the art that many alternatives, modifications, and variations can be made without departing from the scope as defined in the claims. The method steps described may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

A computing environment for executing the document creation application and the classification toolbar may be implemented as computer software in the form of computer readable code executed. The computing environment may be any number of computing or computer based platforms such as mobile devices, personal computer, notebook computers, or personal digital assistants. The computer comprises central processing unit (CPU) and memory. The CPU may be a single processor or multiprocessor system. In various computing environments, main memory and storage can reside wholly on computer environment, or they may be distributed between multiple computers.

Input devices such as a keyboard and mouse may be coupled to a bi-directional system bus of a computer for receiving input for creating documents within the web client. The keyboard and mouse are for introducing user input to a computer and communicating that user input to processor if required. Computer may also include a communication interface. Communication interface provides a two-way data communication coupling via a network link to a network by wired or wireless connection or may provide an interface to other host devices by a direct radio frequency connection. In any such implementation, communication interface sends and receives electrical, electromagnetic or optical signals which carry digital data streams representing various types of information. Communication between the communication interface unit and the network or host use electrical, electromagnetic or optical signals which carry digital data streams. The signals through the various networks and the signals on network link and through communication interface, which carry the digital data to and from computer, are exemplary forms of carrier waves transporting the information.

The computer processor or similar device may be programmed in the manner of method steps, or may be executed by an electronic system which is provided with means for executing these steps. The storage device may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing these method steps may also be transmitted via a communication network.

The embodiments described above are intended to be illustrative only. The scope of the invention is therefore intended to be limited solely by the scope of the appended claims.

The invention claimed is:

1. A method executed by a processor for management of e-mail messages having embedded classification metadata, the method comprising:
    receiving a query from an end user to access an e-mail account by an e-mail client;
    determining whether the query has come from an insecure e-mail client;
    retrieving access rules for defining classification access restrictions for the e-mail client to access e-mail messages in the e-mail account, when the e-mail client is determined to be insecure; and
    modifying the received query, before sending to an e-mail server storing the email account, the query being modified based on the retrieved access rules to exclude retrieval of e-mail messages based upon the embedded e-mail classification metadata;
    sending the query to the e-mail server;

receiving e-mail messages from the e-mail server based upon the query by sensitivity associated with the classification access restrictions of the e-mail messages determined by inspecting classification metadata embedded in each e-mail message; and sending the received e-mail messages to the e-mail client.

2. The method of claim 1 wherein sending the retrieved e-mail messages to the e-mail client further comprises sending only message header information for the excluded e-mail messages.

3. The method of claim 1 wherein the e-mail client is a web mail client using HTML web access.

4. The method of claim 1 wherein the e-mail client is an Outlook Web Access client.

5. The method of claim 1 wherein the query is an structured query language (SQL) query.

6. The method of claim 1 further comprising:
determining whether the e-mail client is entitled to view an e-mail message with attachments; and
modifying the query to exclude e-mail messages with attachments.

7. The method of claim 1 wherein determining whether the query has come from an insecure e-mail client further comprises determining an encryption level associated with the access client.

8. The method of claim 1 wherein determining whether the query has come from an insecure e-mail client further comprises identifying an originating location of the e-mail client.

9. The method of claim 1 wherein the access rules define classification metadata to be excluded in the query.

10. The method of claim 1 wherein the classification restrictions are defined as PERSONAL, UNCLASSIFIED, CONFIDENTIAL, SECRET.

11. The method of claim 1 wherein the query is modified to exclude the viewing of any web based e-mail messages in the user's e-mail account Inbox that have not been classified.

12. The method of claim 1 wherein the pre-defined access rules are provide in a javascript file.

13. The method of claim 1 wherein the access rules define classification metadata to be included in the query.

14. The method of claim 1 further comprising initially receiving an user identifier and password associated with the e-mail account.

15. A system for management of e-mail messages having embedded classification metadata, the system comprising:
a memory; and
a processor for executing:
receiving a query from an end user to access an e-mail account by an e-mail client;
determining whether the query has come from an insecure e-mail client;
retrieving access rules for defining classification access restrictions for the e-mail client to access e-mail in the e-mail account, when the e-mail client is determined to be insecure;
modifying the received query, before sending to an e-mail server storing the email account, the query being modified based on the retrieved access rules to exclude retrieval of e-mail messages based upon the embedded e-mail classification metadata;
sending the query to the e-mail server;
receiving e-mail messages from the e-mail server based upon the query by sensitivity associated with the classification access restrictions of the e-mail messages determined by inspecting classification metadata embedded in each e-mail message; and
sending the received e-mail messages to the e-mail client.

16. A non-transitory computer readable medium containing instructions for providing management of e-mail messages having embedded classification metadata, the instructions which when executed by a processor performing:
receiving a query from an end user to access an e-mail account by an e-mail client;
determining whether the query has come from an insecure e-mail client;
retrieving access rules for defining classification access restrictions for the e-mail client to access e-mail messages in the e-mail account, when the e-mail client is determined to be insecure;
modifying the received query, before sending to an e-mail server storing the email account, the query being modified based on the retrieved access rules to exclude retrieval of e-mail messages based upon the embedded e-mail classification metadata;
sending the query to the e-mail server;
receiving e-mail messages from the e-mail server based upon the query by sensitivity associated with the classification access restriction of the e-mail messages determined by inspecting classification metadata embedded in each e-mail message; and
sending the received e-mail messages to the e-mail client.

* * * * *